UNITED STATES PATENT OFFICE.

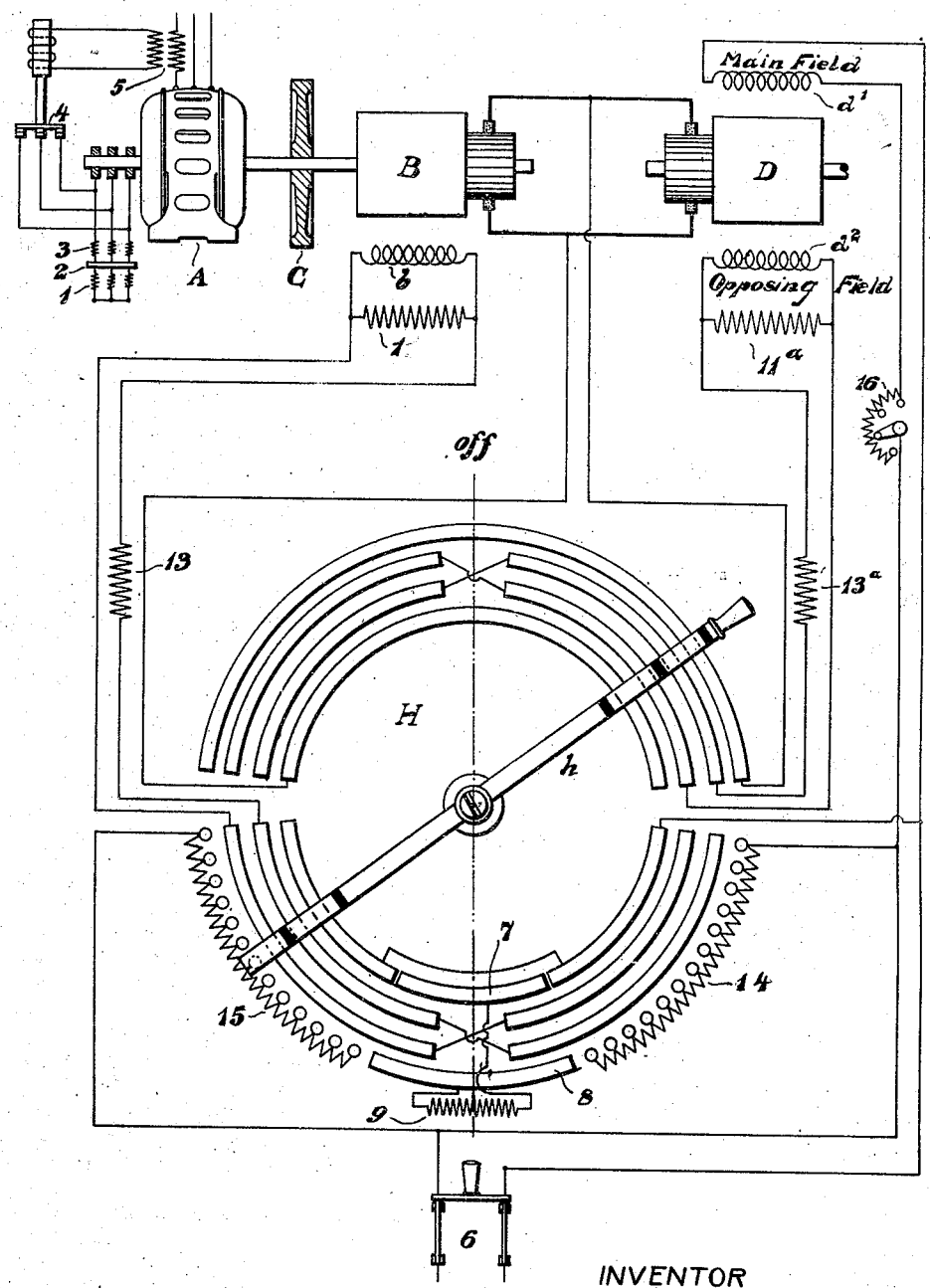

WILLIAM H. POWELL, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

MOTOR-CONTROL SYSTEM.

No. 865,816.  Specification of Letters Patent.  Patented Sept. 10, 1907.

Application filed July 30, 1906. Serial No. 328,326.

*To all whom it may concern:*

Be it known that I, WILLIAM H. POWELL, a citizen of the United States, residing at Norwood, in the county of Hamilton and State of Ohio, have invented certain new and useful Improvements in Motor-Control Systems, of which the following is a full, clear, and exact specification.

My invention relates to control systems and particularly to control systems for mills and hoisting motors. In rolling mills and in hoisting machinery it is necessary that the moving parts be quickly and often reversed. Heretofore, steam engines have generally been used for this work. Certain electrical systems for doing the same work have been proposed by others, but these have generally been unsatisfactory.

In my copending applications Serial Nos. 311,827; 324,126; and 328,047, filed April 16, 1906, June 30, 1906, and July 27, 1906, respectively, I have illustrated and described systems in which a great many of the difficulties of these prior electrical systems have been overcome. In all of these co-pending applications, systems have been described in which the working motor is supplied with current by a special generator on whose shaft is a fly-wheel, there being a single controlling arm which varies inversely the field resistances of the working motor and the special generator.

My present invention is intended to obtain the same result as is obtained in the system described in my copending applications, viz., obtaining an inverse variation of the field strengths of the working motor and the special generator, but does this without necessitating the use of a variable resistance in the working motor field circuit.

In one aspect my invention consists of a motor control system comprising a motor, a source of current for supplying one of the motor field windings, a second source of current for supplying another of the motor field windings and the motor armature, and means for varying the electromotive force of said second source of current.

In a more specific aspect my invention consists of a system of motor control comprising a source of current, a motor supplied thereby, a fly-wheel mechanically connected to said motor, a generator driven by said motor, a second motor having main and opposing field windings whose armature and opposing field windings are supplied by said generator, a separate source of supply for the field windings of said second motor, and means for varying and reversing the field of said generator.

Other features of my invention will appear from the following description and accompanying drawings and will be particularly pointed out in the claims.

The single figure of the drawings shows one embodiment of my invention.

In this figure A is an electric motor of the three-phase induction type, though obviously other forms of motors could be used instead. In the rotor circuit of this motor is a starting resistance 1 adjustable by means of a short-circuiting bar 2, and a regulating resistance 3 arranged to be cut in and out by a solenoid switch 4, which in turn is responsive to the current strength in the primary circuit of the motor as through a series transformer 5. Other means for varying the speed of motor A may be used if desired. A generator armature B is driven by the motor A, being preferably directly connected thereto, and on the common shaft of the motor A and the generator B is a heavy flywheel C. The generator B supplies current to the armature D and an opposing field winding $d^2$ of the working motor. The motor D may be used to drive any desired machinery.

The field windings $b$ of the generator B and the main field windings $d'$ of the working motor D are supplied from any direct current source through a switch 6. The strength of the field coil $d'$ is usually kept constant but may be adjusted by a rheostat 16. The field coil $b$ is controlled by the main controller H, which is arranged to vary the resistance in circuit with this field coil and to reverse the current therethrough. The controller H is also arranged to reverse the current in the opposing shunt field coil $d^2$ of the working motor. The arm or handle $h$ of this controller is divided into several electrically distinct parts as shown. The lower part of the controller H varies and reverses the current in the generator field coil $b$ while the upper part reverses the connections of the opposing field coil $d^2$ of the working motor. There are shown two variable resistances 14 and 15 for the generator field coil, but if desired instead of having these resistances separate the contacts of one may be connected to the corresponding contacts of the other, one of the resistances being omitted.

The controller is arranged so that when its arm $h$ is moved on one side of the vertical the resistance 14 is varied to control the speed of the motor D in one direction, and when moved on the other side of the vertical resistance 15 is varied to control the motor D in the other direction, the direction of current through the coil $b$ being reversed as the arm $h$ passes through its vertical or "off" position. As the arm $h$ passes through its vertical position it also reverses the connections of the shunt field coil $d^2$ of the working motor, but this is not for the purpose of reversing the current through this coil but in order to maintain the current therethrough in the same direction; for by reversing the current in coil $b$, the current supplied by armature B is also reversed. Between the segments 7 and 8 of the controller is arranged a resistance 9 to take up the generator field discharge when the circuit through the coil $b$ is broken. A similar resistance could be used if desired to take up the discharge of the coil $d^2$, but this is generally unnecessary because this field coil can discharge through the armatures B and D.
The resistance 9 is aided in taking up the field discharge of coil $b$ by a high resistance 11 permanently connected across the coil $b$. A similar high resistance $11^a$, identical in purpose and operation with the coil 11, may be connected across the coil $d^2$ to assist in taking up the field discharge of the latter.

A non-inductive resistance 13 is connected in series with the field coil B. This resistance has an ohmic value several times as great as that of the field coil with which it is in series. The purpose of this resistance is to diminish the time constant of the field magnet $b$, for the time constant of a circuit is the function of its inductance divided by its resistance. Therefore, by increasing the resistance of the field circuit without increasing its inductance, the current strength being kept the same, the time constant of the field magnet is greatly reduced. By this means quick reversals of the motor D may be more readily obtained. If desired, a similar resistance $13^a$ may be placed in the circuit of the opposing coil $d^2$ of the working motor, in order to reduce the time constant of said field coil, although the current in this circuit is never reversed but only varied in strength and interrupted.

The operation of the system is as follows:—The primary circuit of motor A is closed and the motor started by moving the bar 2 to cut out the starting resistance 1. The switch 4 is held open by its solenoid at this time because of the heavy current required for starting the motor, but if desired other means may be used to insure the open condition of this switch during starting. After the motor has gained sufficient speed and the starting resistance has been cut out, the solenoid switch is allowed to close to cut out resistance 3 because of the decrease in the primary current of motor A. The fly-wheel C and generator armature B are also started with the motor A and the fly-wheel stores mechanical energy by its rotation. During this starting the arm $h$ is preferably in its vertical or "off" position. The switch 6 now being closed, the field of the working motor is at its strongest, for the opposing field coil $d^2$ is deënergized and the constant main field coil $d'$ is not weakened thereby. The generator field coil $b$ is deënergized. The arm $h$ is now gradually moved from the vertical to the horizontal in the proper direction to give the motor D the desired direction of rotation. As this arm moves, say clock-wise, it first connects the coil $d^2$ across armature B though at this time that armature is supplying no current. Next the circuit of the generator field coil $b$ is closed through the whole resistance 15 and said resistance is gradually cut out of circuit. As this resistance is cut out the strength of field coil $b$ gradually increases, thus correspondingly increasing the electromotive force impressed on the armature D and the opposing field coil $d^2$ of the working motor, the latter by increasing in strength causing the resultant total field of said motor to decrease in strength. Thus the speed of motor D is increased, both because the electromotive force impressed upon it is increased and because its field strength is decreased. The speed which the motor D acquires depends upon the extent of movement of the arm $h$, the full speed being reached when the entire resistance 15 has been cut out of circuit.

If the load is heavy the working motor requires more power for its starting than the motor D can furnish. The current rising in the primary of transformer 5 by reason of this heavy load, the switch 4 is opened, thus inserting resistance 3 into the rotor circuit of motor A. This increases the slip of motor A and permits said motor to slow down, thus allowing the fly-wheel C to give up some of the mechanical energy it has stored, which energy helps the motor A to drive generator B to supply electrical energy at the rate demanded by the motor D to drive its load.

As the arm $h$ is moved backward toward the vertical, the field $d$ is weakened to decrease the electromotive force of armature B. This decreases the speed of motor D because of the decrease in the electromotive force impressed on its armature and also because of the increase in its total field strength due to the decrease in the strength of the opposing shunt field coil $d^2$, and causes it to act as a generator to supply current to the armature B, the latter now serving as a motor to help restore energy to the fly-wheel C. There is a powerful braking effect on the working motor due to its acting as a generator. The diminished current in the primary of transformer 5 also causes the solenoid switch 4 to close, thereby increasing the speed of motor A so that the latter may also supply energy to the fly-wheel C. The fly-wheel thus stores up any excess of energy supplied when the rate of such supply exceeds the rate at which energy is demanded by the working motor, and gives up said stored energy whenever the rate at which energy is demanded by the working motor is greater than the rate at which energy is supplied. When the arm $h$ leaves the contacts of resistance 15, and slides over the segments 7 and 8, the resistance 9 is connected in circuit with the coil $b$ to take the field discharge therefrom, the resistances 11 and 13 assisting in this. After the field coil $b$ is disconnected the circuit of the opposing shunt coil $d^2$ of the working motor is also broken. When the arm $h$ is moved in the other direction from the vertical the above cycle is repeated save that the working motor D is caused to rotate in the other direction and the resistance 14 is used instead of the resistance 15.

With my invention it is possible to quickly reverse motors especially those of large capacity and to do this with a very small waste of energy. It is also possible to diminish the carrying capacity of the mains which supply the motor A because of the great uniformity with which energy is demanded of this motor. The capacity of machines B and D can also be greatly reduced because the maximum current and maximum voltage are demanded by the working motor at nearly the same time. Another advantage of my invention is that the maximum armature current is less and flows when the generator has a stronger field magnetism, commutation being thus greatly assisted. There are many other advantages of my invention which it is not necessary to point out as they will be obvious to one skilled in the art.

When I use the term "inversely" in this description and in the claims, I do not wish to limit myself to exact "inverse proportion", but intend the term to include any increase in one and decrease in the other of the two things specified.

I have described my invention in what I now consider to be its preferred form, but I aim to cover all those obvious modifications which readily occur to one skilled in the art.

Having thus described my invention, what I claim as new and desire to secure by Letters Patent is:—

1. A system of motor control, comprising a motor having a main field and an opposing field, a generator for supplying the armature of said motor, a separate source for supplying the main field winding of the motor, and means for varying the electromotive force of the generator and the total field strength of the motor.

2. A system of motor control, comprising a motor having a main field and an opposing field, a generator for supplying the armature of said motor, a separate source for supplying the main field winding of the motor, and means for varying the electromotive force of the generator and the total field strength of the motor inversely.

3. A system of motor control, comprising a motor having main and opposing field windings, a generator for supplying the armature of the motor, a separate source of current for supplying the main field winding of the motor, and means for varying the electromotive force of the generator and the strength of current in the opposing field winding of the motor.

4. A system of motor control, comprising a motor having main and opposing field windings, a generator for supplying the armature of the motor, a separate source of current for supplying the main field winding of the motor, and means for varying the electromotive force of the generator and the strength of current in the opposing field winding of the motor correspondingly.

5. A system of motor control, comprising a motor having main and auxiliary field windings, a generator for supplying the armature of said motor, a separate source of current for supplying one of the field windings of the motor, and a single means for varying the field strengths of the generator and the motor.

6. A system of motor control, comprising a motor having main and auxiliary windings, a generator for supplying the armature of said motor, a separate source of current for supplying one of the field windings of the motor, and a single means for varying the field strengths of the generator and the motor inversely.

7. A system of motor control, comprising a motor having main and auxiliary field windings, a generator for supplying the armature and auxiliary field winding of the motor, a separate source of current for supplying the main field winding of the motor, and means for varying the electromotive force of the generator.

8. A system of motor control comprising a motor having main and auxiliary field windings, a generator for supplying the armature and auxiliary field winding of the motor, a separate source of current for supplying the main field winding of the motor, and means for varying and reversing the electromotive force of the generator.

9. A system of motor control, comprising a motor having main and auxiliary field windings, a generator for supplying the armature and auxiliary field winding of the motor, a separate source of current for supplying the main field winding of the motor, and means for varying the field of the generator.

10. A system of motor control, comprising a motor having main and auxiliary field windings, a generator for supplying the armature and auxiliary field winding of the motor, a separate source of current for supplying the main field winding of the motor, and means for varying and reversing the field of the generator.

11. A system of motor control, comprising a motor having main and opposing field windings, a generator for supplying the armature and opposing field winding of the motor, a separate source of current for supplying the main field winding of the motor, and means for varying the electromotive force of the generator.

12. A system of motor control, comprising a motor having main and opposing field windings, a generator for supplying the armature and opposing field winding of the motor, a separate source of current for supplying the main field winding of the motor, and means for varying and reversing the electromotive force of the generator.

13. A system of motor control, comprising a motor having main and opposing field windings, a generator for supplying the armature and opposing field winding of the motor, a separate source of current for supplying the main field winding of the motor, and means for varying the field of the generator.

14. A system of motor control, comprising a motor having main and opposing field windings, a generator for supplying the armature and opposing field winding of the motor, a separate source of current for supplying the main field winding of the motor, and means for varying and reversing the field of the generator.

15. A system of motor control, comprising a motor having a separately excited main field and a shunt opposing field, a generator for supplying the armature and shunt field of the motor, and means for varying the electromotive force of said generator.

16. A system of motor control, comprising a motor having a separately excited main field and a shunt opposing field, a generator for supplying the armature and shunt field of the motor, and means for varying and reversing the electromotive force of said generator.

17. A system of motor control, comprising a motor having a separately excited main field and shunt opposing field, a generator for supplying the armature and shunt field of the motor, and means for varying the field of said generator.

18. A system of motor control, comprising a motor having a separately excited main field and a shunt opposing field, a generator for supplying the armature and shunt field of the motor, and means for varying and reversing the field of the generator.

19. A system of motor control, comprising a motor having a separately excited main field and a shunt opposing field, a generator for supplying the armature and shunt field of the motor, and means for varying and reversing the electromotive force of the generator and for reversing the connections of the motor shunt field.

20. A system of motor control, comprising a motor having a separately excited main field and a shunt opposing field, a generator for supplying the armature and shunt field of the motor, and means for varying and reversing the generator field and for reversing the connections of the motor shunt field.

21. In a system of motor control, comprising a dynamo-electric generator driven by a source of substantially constant power, a combined shunt and separately excited motor supplied by the generator, means for varying the electromotive force of the generator, and means for mechanically storing any excess of the energy supplied by the driving source and supplying said stored energy to the motor whenever required.

22. A system of motor control, comprising a combined shunt and separately excited motor, means for varying the electromotive force impressed on its armature, and means for mechanically storing any excess of supplied energy when the motor load is light and for supplying said stored energy to the motor as electrical energy when the motor load is heavy.

23. A system of motor control, comprising a dynamo-electric generator, a motor supplied thereby, shunt and separately excited field windings on said motor, means for varying the electromotive force of the generator, means for storing any excess of the mechanical energy supplied to the generator when its rate of supply exceeds the power demanded by the motor at that time, and means for causing said stored energy to be supplied to the motor whenever the power demanded by the motor is above that normally supplied.

24. A motor control system, comprising a source of substantially constant mechanical power, a generator driven thereby, a variably loaded combined shunt and separately excited motor whose armature and shunt field winding are supplied by the generator, a separate source of current which supplies the main field winding of the motor, means for varying the electromotive force of the generator, means for storing any excess of the mechanical energy supplied by the source when its rate of supply exceeds the rate at which energy is demanded by the load on the motor, and means for causing said stored energy to be supplied to the motor as electrical energy when energy is demanded by the load at a rate which exceeds the normal rate at which the mechanical energy is supplied.

25. A motor control system, comprising a motor having main and opposing field windings, means for inversely varying its total field strength and the electromotive force impressed upon its armature, means for mechanically storing any excess of energy when the supplied power exceeds the power demanded by the motor load, and means for causing said stored energy to be supplied to the motor as electrical energy when the power demanded by the motor load exceeds the supplied power.

26. In combination, a source of power, a generator driven thereby, a motor whose armature and shunt field are supplied by the generator, a separately excited main field for the motor, means for varying the field strength of the generator, a fly-wheel on the shaft of the power source, and means for causing the fly-wheel to give up its energy when the load on the motor rises above normal.

27. In combination, a source of power, a generator driven thereby, a motor having an armature and an opposing field winding supplied by said generator and a main field winding supplied from a separate source, means for varying the resistance in the field circuit of the generator, a fly-wheel on the generator shaft, and means for allowing said fly-wheel to give up its energy when the motor load rises above normal.

28. A system of motor control, comprising a motor having main and auxiliary field windings, a generator supplying said motor, a flywheel on the shaft of said generator, and means for inversely varying the field strengths of said generator and said motor.

29. A system of motor control, comprising a motor having shunt and separately excited field windings, a generator supplying the armature and shunt winding of said motor, a fly-wheel mechanically connected to said generator, means for permitting the fly-wheel to give up its energy whenever the load on the motor exceeds a predetermined value, and a controller for varying the field strength of the generator to vary the speed of the motor and to cause energy to be restored to the fly-wheel while the motor is being retarded.

30. In a system of motor control, a motor having a plurality of field windings, a generator supplying the armature and one of the field windings of said motor, a fly-wheel mechanically connected to said generator, means for varying the field strength of the generator to vary the field strength and impressed electromotive force on the armature of the working motor, and means for causing the generator to run slower when the motor load is heavy than when the motor load is light.

31. In combination, a motor having a constant field and a variable field, a generator for supplying the armature of said motor, and means for varying the generator field and the variable field of the motor.

32. In combination, a motor having a constant field and a variable field, a generator for supplying the armature of said motor, and means for varying and reversing the field of the generator and for reversing the connections of the variable field of the motor.

33. In combination, a motor having a constant field and an opposing variable field, a generator for supplying the armature of said motor, and means for varying the generator field and the variable field of the motor.

34. In combination, a motor having a constant field and an opposing variable field, a generator for supplying the armature of said motor, and means for varying and reversing the field of the generator and for reversing the connections of the variable field of the motor.

35. In combination, a motor having a main field winding of constant strength and an opposing field winding of variable strength, a generator supplying the armature and opposing field winding of the motor, and means for varying the electromotive force of the generator.

36. In combination, a motor having a main field winding of constant strength and an opposing field winding of variable strength, a generator supplying the armature and opposing field winding of the motor, and means for varying and reversing the electromotive force of the generator.

37. In combination, a motor having a main field winding of constant strength and an opposing field winding of variable strength, a generator supplying the armature and opposing field winding of the motor, and means for varying and reversing the electromotive force of the generator and for reversing the connections of the opposing field of the motor.

38. In combination, a motor having a separately excited field winding of constant strength and an opposing shunt field winding of variable strength, a generator supplying the armature and shunt winding of the motor, and means for varying the field strength of the generator.

39. In combination, a motor having a separately excited field winding of constant strength and an opposing shunt field winding of variable strength, a generator supplying the armature and shunt winding of the motor, and means for varying and reversing the field of the generator.

40. In combination, a motor having a separately excited field winding of constant strength and an opposing field winding of variable strength, a generator supplying the armature and opposing field winding of said motor, and means for varying and reversing the field of the generator and for reversing the connections of the opposing field winding of the motor.

41. A system of motor control, comprising a generator, a combined shunt and separately excited motor supplied by the generator, means for varying the field strength of the generator, and a resistance permanently in the generator field circuit.

42. A system of motor control, comprising a generator, a combined shunt and separately excited motor supplied by the generator, means for varying the field strength of the generator, and a resistance permanently in the motor shunt field circuit.

43. A system of motor control, comprising a generator, a combined shunt and separately excited motor supplied by the generator, means for varying the field strength of the generator, and resistances permanently in the generator field circuit and the motor shunt field circuit respectively.

44. A system of motor control, comprising a generator, a combined shunt and separately excited motor supplied thereby, means for varying and reversing the generator field, and a high resistance connected across the generator field terminals.

45. A system of motor control, comprising a generator, a combined shunt and separately excited motor supplied thereby, means for varying and reversing the field of the generator and for reversing the connections of the motor shunt field, and a high resistance connected across the motor shunt field.

46. A system of motor control, comprising a generator, a combined shunt and separately excited motor supplied thereby, means for varying and reversing the field of the generator and for reversing the connections of the motor shunt field, and high resistances connected across the generator field and the motor shunt field respectively.

In testimony whereof I affix my signature, in the presence of two witnesses.

WILLIAM H. POWELL.

Witnesses:
GEO. B. SCHLEY,
FRED J. KINSEY.

It is hereby certified that in Letters Patent No. 865,816, granted September 10, 1907, upon the application of William H. Powell, of Norwood, Ohio, for an improvement in "Motor-Control Systems," an error appears in the printed specification requiring correction, as follows: In line 130, page 3, the word "In" should be stricken out; and that the said Letters Patent should be read with this correction therein that the same may conform to the record of the case in the Patent Office.

Signed and sealed this 29th day of October, A. D., 1907.

[SEAL.]

E. B. MOORE,
*Commissioner of Patents.*